US012780317B2

(12) United States Patent
Kamei et al.

(10) Patent No.: US 12,780,317 B2
(45) Date of Patent: Nov. 3, 2026

(54) PROTECTIVE STRUCTURE

(71) Applicant: SUBARU CORPORATION, Tokyo (JP)

(72) Inventors: Kentaro Kamei, Tokyo (JP); Yoshio Wada, Tokyo (JP); Hisayuki Nagatsu, Tokyo (JP)

(73) Assignee: Subaru Corporation, Tokyo (JP)

( * ) Notice: Subject to any disclaimer, the term of this patent is extended or adjusted under 35 U.S.C. 154(b) by 267 days.

(21) Appl. No.: 18/738,892

(22) Filed: Jun. 10, 2024

(65) Prior Publication Data

US 2025/0026407 A1 Jan. 23, 2025

(30) Foreign Application Priority Data

Jul. 18, 2023 (JP) ................................ 2023-117161

(51) Int. Cl.
*B62D 21/15* (2006.01)
*B62D 27/06* (2006.01)

(52) U.S. Cl.
CPC .......... *B62D 21/155* (2013.01); *B62D 27/065* (2013.01)

(58) Field of Classification Search
CPC ............................ B62D 21/155; B62D 27/065
See application file for complete search history.

(56) References Cited

U.S. PATENT DOCUMENTS

2015/0214812 A1* 7/2015 Tooyama ............... H02K 5/225 310/71
2015/0246621 A1* 9/2015 Katano ................... B60L 50/72 180/65.31
2020/0283071 A1* 9/2020 Murai ................. B60R 16/0207
2025/0019005 A1* 1/2025 Kamei ................. B62D 27/065

FOREIGN PATENT DOCUMENTS

CN 218316668 * 1/2013
JP 6090185 B 3/2017

* cited by examiner

*Primary Examiner* — Jonathan Malikasim
(74) *Attorney, Agent, or Firm* — McGinn IP Law Group, PLLC

(57) ABSTRACT

A protective structure includes a first bracket and a second bracket. The first bracket includes a first fixing portion protruding toward an upper side of a vehicle. The second bracket is placed on the first fixing portion of the first bracket in a state of being divided from the first bracket and covers a protection target part to be protected from interference of a collision object in a vehicle up and down direction. The second bracket is fixed to a second fixing portion provided on a protection target member including the protection target part on an upper side of the second bracket, and is further fixed to the first fixing portion of the first bracket on a lower side of the second bracket. The first bracket and the second bracket are disposed between the protection target part and an adjacent member disposed adjacent to the second bracket.

16 Claims, 4 Drawing Sheets

PROTECTIVE STRUCTURE

CROSS-REFERENCE TO RELATED APPLICATIONS

The present application claims priority from Japanese Patent Application No. 2023-117161 filed on Jul. 18, 2023, the entire contents of which are hereby incorporated by reference.

BACKGROUND

The disclosure relates to a protective structure.

In recent years, with the spread of electric vehicles, when a vehicle is a hybrid vehicle, an electric vehicle, or the like, an inverter unit that converts a DC voltage into an AC voltage may be mounted in a front part of the vehicle in order to drive an electric motor.

For example, in the inverter unit, a high voltage for traveling of the vehicle is generated, and there is a possibility that a sudden abnormal reaction occurs when deformation or disconnection occurs due to a front collision or the like of the vehicle.

Thus, there is a demand for a structure that reduces an influence on a device that uses a high voltage such as an inverter or an air compressor when a collision occurs in a vehicle.

As a technique corresponding to the problem described above, since a gap between the air compressor as an auxiliary machine and a bracket is the narrowest in the vicinity of an upper attachment part, the upper attachment part having relatively low rigidity is deformed when the vehicle collides forward, and the air compressor rotates with respect to the bracket with the lower attachment part having relatively high rigidity as a fulcrum. A technique is disclosed in which a bracket abuts on an air compressor at a portion where the gap between the air compressor and the bracket is narrowest, thereby suitably suppressing falling of the air compressor due to an impact at the time of a front collision of a vehicle (see, for example, Japanese Patent No. 6090185).

SUMMARY

An aspect of the disclosure provides a protective structure. The protective structure includes a first bracket and a second bracket. The first bracket includes a first fixing portion protruding toward an upper side of a vehicle. The second bracket is placed on the first fixing portion of the first bracket in a state of being divided from the first bracket and covers a protection target part to be protected from interference of a collision object as a wall surface in a vehicle up and down direction. The second bracket is fixed to a second fixing portion provided on a protection target member including the protection target part on an upper side of the second bracket, and is further fixed to the first fixing portion of the first bracket on a lower side of the second bracket. The first bracket and the second bracket are disposed between the protection target part and an adjacent member disposed adjacent to the second bracket.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIGS. 2A to 2C are three views illustrating a protective structure according to an embodiment of the disclosure, in which FIG. 2A is a plan view as viewed from above, FIG. 2B is a front view, and FIG. 2C is a side view as viewed from a right side;

DETAILED DESCRIPTION

Figure 1:
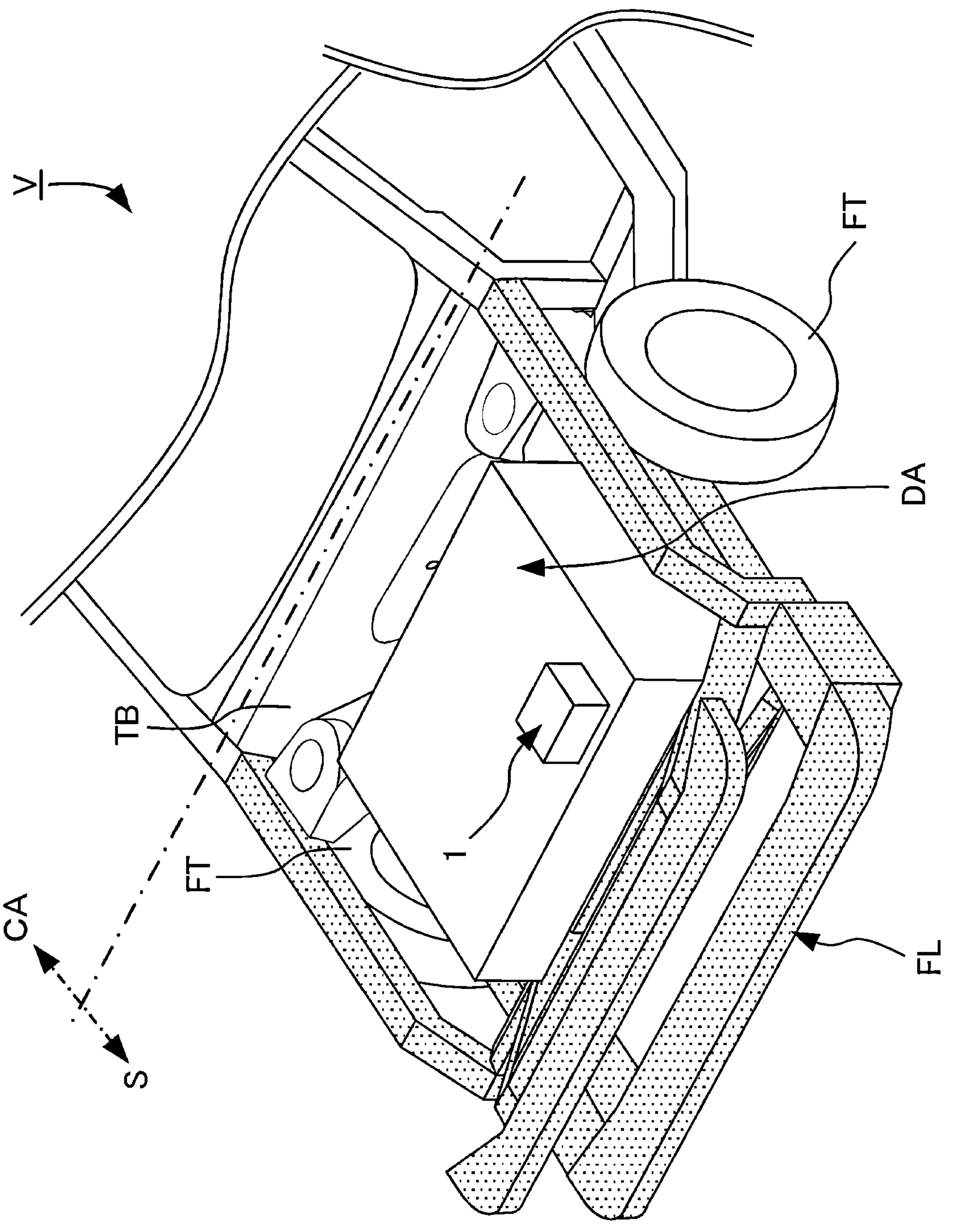
FIG. 1 is a perspective view of a vehicle to which a protective structure according to an embodiment of the disclosure is applied as viewed from above.

In the technique described in Japanese Patent No. 6090185, collision energy is concentrated on one point of an upper attachment part having relatively low rigidity at the time of a front collision of a vehicle, and the upper attachment part is damaged, thereby preventing an air compressor as a device to be protected from falling off.

However, the technique described in Japanese Patent No. 6090185 has a problem that, when a collision occurs in the vehicle, members disposed adjacent to each other may interfere with a device to be protected.

It is desirable to provide a protective structure that effectively prevents interference with a device to be protected when a collision occurs in a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A protective structure 1 according to the embodiment will be described with reference to FIGS. 1 to 4C. Note that, as illustrated in FIGS. 2A to 2C, an arrow FR appropriately illustrated in the drawings indicates a front side of the protective structure 1, and an arrow UP indicates an upper side of the protective structure 1 as viewed from the front side, and an arrow LH indicates a left side of the protective structure 1 as viewed from the front side. In addition, in the following description, when description is made using up and down, front and rear, and left and right directions, unless otherwise specified, an up and down direction when the protective structure 1 is viewed from the front side, a front and rear direction when the front side of the protective structure 1 is the front, and a left and right direction when the protective structure 1 is viewed from the front side are indicated.

Embodiment

A configuration of a protective structure 1 according to the present embodiment will be described with reference to FIGS. 1 to 3.

<Vehicle Front Structure S>

Figure 2A:
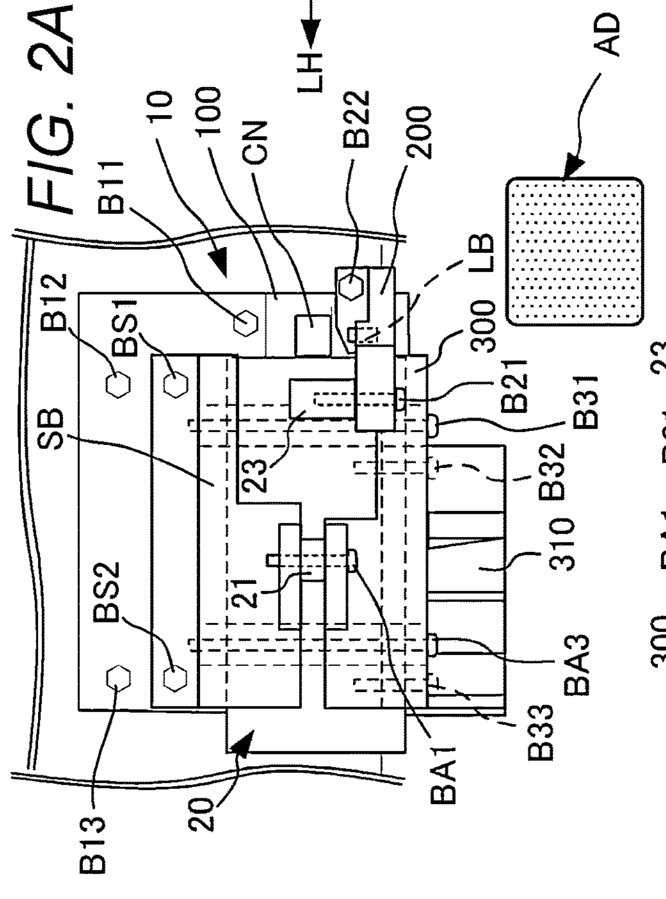
Figure 2B:
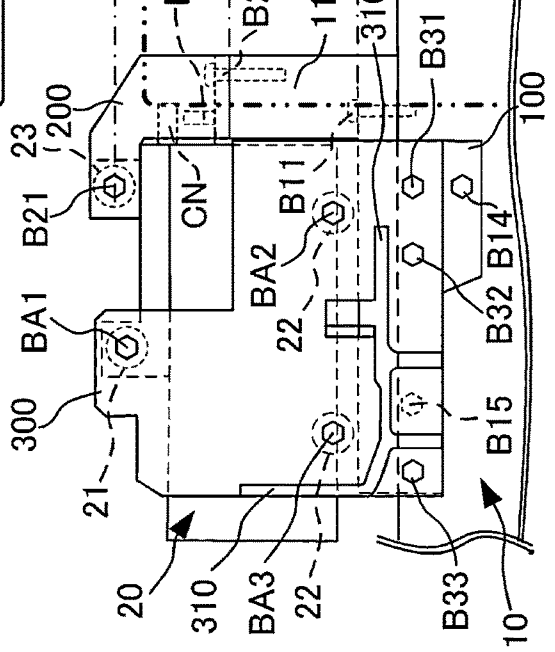
Figure 2C:
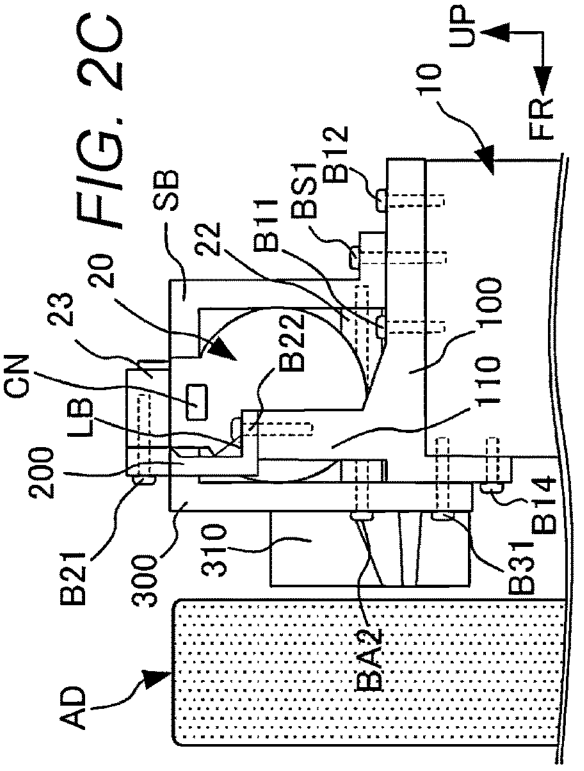

In a vehicle V, as illustrated in FIG. 1, a vehicle front structure S is formed on a vehicle front side of a cabin CA as a vehicle interior on which an occupant gets. The vehicle front structure S is provided on a vehicle front side of a toe board TB. The vehicle front structure S includes a frame FL and a drive unit DA.

(Frame FL)

As illustrated in a dot hatched portion of FIG. 1, the frame FL is coupled in a parallel cross shape in a vehicle width direction and a vehicle front and rear direction in the vehicle front structure S. The frame FL is a skeleton of the vehicle V, and is formed by a strong metal or the like having a substantially rectangular closed cross-sectional shape.

The frame FL protects the cabin CA and the drive unit DA by absorbing and dispersing an impact of a collision in the frame FL when the collision occurs.

(Drive Unit DA)

The drive unit DA is disposed in a region of the vehicle front structure S, and is surrounded by the toe board TB and the frame FL.

The drive unit DA includes, for example, a power unit including a vehicle driving motor in an internal combustion engine or an electric vehicle that drives the front wheel FT, and is a drive device provided with a transmission, a clutch, a drive shaft, and the like.

The drive unit DA is firmly fixed to the frame FL.

<Protective Structure 1>

The protective structure 1 is a structure applied to, for example, a device constituting the drive unit DA that drives the front wheel FT of the vehicle V.

As illustrated in FIGS. 2A to 2C, the protective structure 1 includes a base 10, a lower bracket 100 as a first bracket, a protective bracket 200 as a second bracket, a front bracket 300, and a sub bracket SB.

As illustrated in FIGS. 2A to 2C, an adjacent member AD is disposed adjacent to the protective bracket 200 on the front side of the protective structure 1. The adjacent member AD is, for example, an oil filter or an oil cooler.

The adjacent member AD is a collision object to the protective structure 1 when a collision occurs in the vehicle V.

Inside the protective structure 1, for example, an air compressor 20 as a protection target member that uses a high voltage is fixed to the base 10 via the front bracket 300 and the sub bracket SB.

The air compressor 20 is formed in a substantially columnar shape, and fixing pedestals 21 to 23 for fixing bolts are formed on the upper and lower sides of the air compressor 20.

A front bracket 300 is provided on the front side of the air compressor 20, and a sub bracket SB is provided on the rear side of the air compressor 20.

The air compressor 20 is fixed by bolts or the like via the fixing pedestal 21 and the fixing pedestal 22 in a state of being sandwiched between the front bracket 300 and the sub bracket SB in the front and rear direction. The air compressor 20 is fixed to the base 10 via the front bracket 300 and the sub bracket SB.

A protrusion CN as a protection target part is disposed on the right side of the protective structure 1 of the air compressor 20 as viewed from the front side. The protrusion CN is, for example, a connection connector that supplies a high voltage to the air compressor 20. The protrusion CN protrudes from the air compressor 20 toward the right side of the protective structure 1 on the rear side of the protective bracket 200.

The protective bracket 200 is fixed to the fixing pedestal 23 by a bolt or the like.

(Base 10)

The base 10 is, for example, an internal combustion engine provided in the drive unit DA, and is configured to disperse an impact caused by the collision to the frame FL when the collision occurs. The base 10 is firmly fixed to the frame FL.

(Sub Bracket SB)

The sub bracket SB is provided on the rear side of the air compressor 20, sandwiches the air compressor between the front bracket 300 and the sub bracket SB, and fixes the air compressor 20 in the front and rear direction of the protective structure 1 by bolts or the like.

The sub bracket SB is fixed to the base 10 on the rear side of the protective structure 1 by penetrating the lower bracket 100 in the up and down direction.

The sub bracket SB is formed by casting using a strong member such as metal, for example.

(Lower Bracket 100)

The lower bracket 100 as the first bracket is fixed to the base 10, and a fixing pedestal 110 protruding toward the vehicle upper side is formed.

The lower bracket 100 is formed by casting using a strong member such as metal, for example.

As illustrated in FIG. 2C, the lower bracket 100 is placed on an upper side of the base 10 and is provided to cover the lower side of the air compressor 20. A front side of the protective structure 1 of the lower bracket 100 is bent in a substantially L shape along a front side of the base 10.

The lower bracket 100 is fixed to the base 10 with a bolt or the like.

For example, the lower bracket 100 is provided with bolt holes penetrating from the upper side to the lower side, and is fixed to the base 10 by, for example, bolts B11 to B13 as illustrated in FIG. 2A.

Bolt holes penetrating from a front side to a rear side of the protective structure 1 are provided on the front side of the protective structure 1 of the lower bracket 100, and is fixed to the base 10 by bolts B14 to B15 as illustrated in FIG. 2B.

As illustrated in FIGS. 2B and 2C, the lower bracket 100 is provided with the fixing pedestal 110 as a first fixing portion. The fixing pedestal 110 protrudes from the lower bracket 100 toward the vehicle upper side on the right side when the protective structure 1 is viewed from the front side.

A protective bracket 200 is fixed to the fixing pedestal 110 by a bolt B22.

Figure 3:
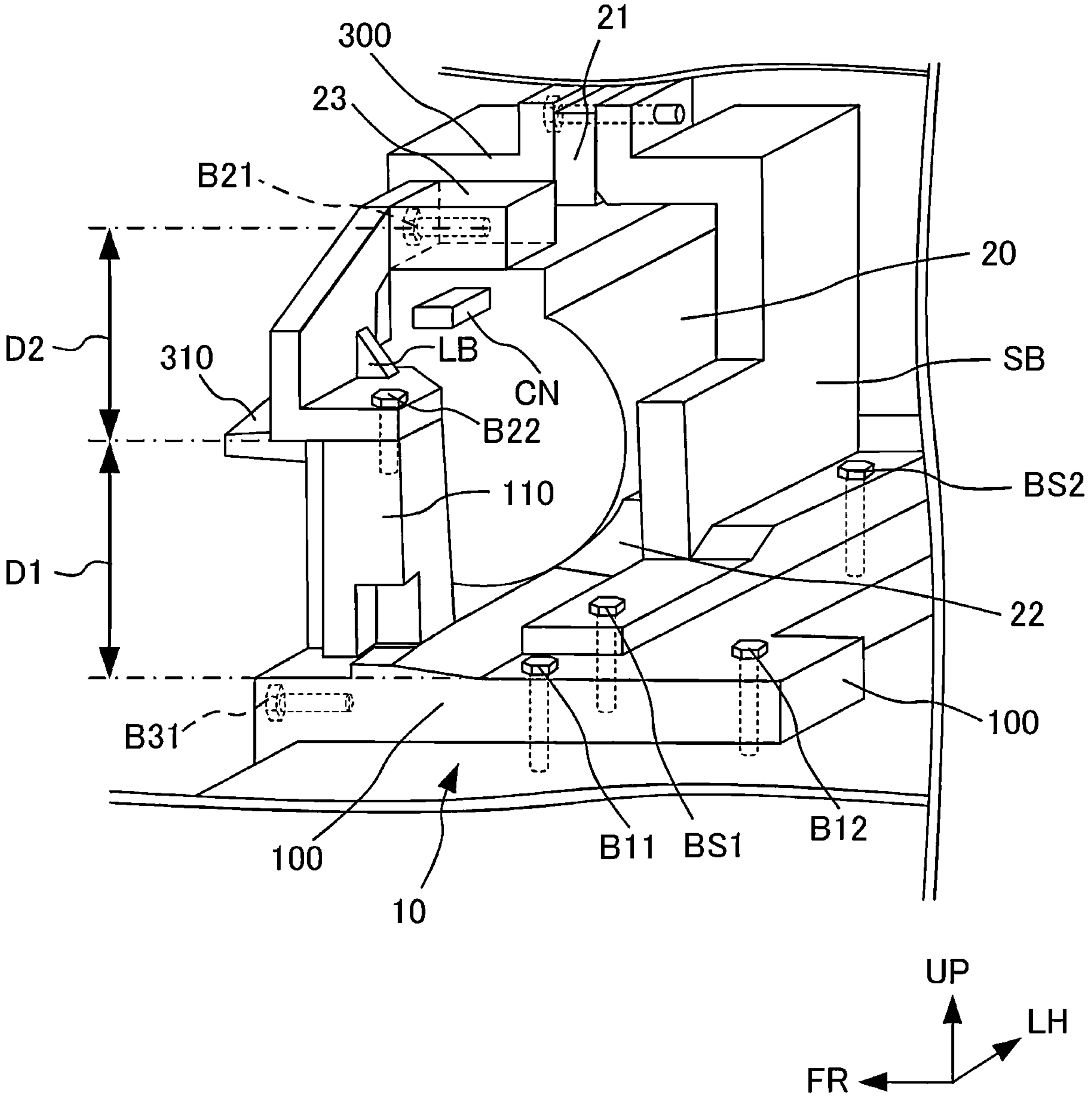
FIG. 3 is a perspective view of the protective structure according to the embodiment of the disclosure as viewed from an upper rear side.

As illustrated in FIGS. 2B and 3, a distance D1 in a vehicle up and down direction between an upper surface side of the lower bracket 100 and an upper surface side of the fixing pedestal 110 is longer than a distance D2 in the vehicle up and down direction between the upper surface side of the fixing pedestal 110 and a center of a bolt hole of the fixing pedestal 23 as a second fixing portion.

(Protective Bracket 200)

The protective bracket 200 as the second bracket is placed on the upper side of the fixing pedestal 110 of the lower bracket 100 in a state of being divided from the lower bracket 100, and covers the protrusion CN as a protection target part as a wall surface in the up and down direction.

The protective bracket 200 is formed by casting using a strong member such as metal, for example. The protective bracket 200 has a substantially L shape that is bent from the lower side toward the upper side and is bent toward the left side in the protective structure 1 on the upper side.

A through hole penetrating from the front side to the rear side of the protective structure 1 is provided on an upper left side of the protective structure 1 of the protective bracket 200, and the protective bracket 200 is fixed to the fixing pedestal 23 of the air compressor 20 by a bolt B21.

Further, a through hole penetrating from the upper side to the lower side is provided on the lower rear side of the protective bracket 200, and the protective bracket 200 is fixed to the fixing pedestal 110 of the lower bracket 100 by the bolt B22.

The bolt B22 in the protective bracket 200 is fixed to the fixing pedestal 110 protruding upward. Further, the protective bracket 200 has a substantially L shape on the front side and a side surface side of the protective structure 1. Therefore, the protective bracket 200 has a configuration in which the bolt B21 and the bolt B22 are close to each other.

The protective bracket 200 is fixed to the air compressor 20 by the bolt B21 from the front side to the rear side in the protective structure 1 in the fixing pedestal 23, and is fixed to the lower bracket 100 by the bolt B22 from the upper side to the lower side in the fixing pedestal 110. In other words, the protective bracket 200 is fixed to the air compressor 20 and the lower bracket 100 by the bolts B21 and the bolts B22 directed in different directions.

The protective bracket 200 is formed in a substantially L-shape that extends from the upper side to the lower side when viewed from the right side in the protective structure 1 and bends from the front side to the rear side in the protective structure 1 on the lower side.

On the rear side of the protective structure 1 of the protective bracket 200, a rib LB formed in a substantially right triangular shape when viewed from the right side of the protective structure 1 is provided. The rib LB is provided with an inclination from an upper front side to a lower rear side in the protective structure 1.

With the protective bracket 200, the protrusion CN is disposed at a substantially intermediate point between the bolt B21 and the bolt B22 fixing the protective bracket 200 in the up and down direction and the left and right direction in the protective structure 1.

(Front Bracket 300)

As illustrated in FIGS. 2B and 2C, the front bracket 300 fixes and supports the air compressor 20, and is fixed to the base 10 with the lower bracket 100 interposed therebetween.

The front bracket 300 is formed by casting using a strong member such as metal, for example. The front bracket 300 is disposed on the front side of the protective structure 1 of the air compressor 20, and is provided so as to cover the up, down, left, and right directions of the air compressor 20.

The front bracket 300 is provided with bolt holes penetrating from the front side to the rear side of the protective structure 1 for fixing the air compressor 20. In the front bracket 300, bolts BA1 to BA3 pass through the fixing pedestal 21 and the fixing pedestal 22, and the air compressor 20 is fixed by being sandwiched between the front bracket 300 and the sub bracket SB.

Bolt holes penetrating from the front side to the rear side of the protective structure 1 are provided on the front side of the front bracket 300. As illustrated in FIG. 2B, the front bracket 300 penetrates the lower bracket 100 and is fixed to the base 10 by bolts B31 to B33. The front bracket 300 is fixed to the base 10 in surface contact with the lower bracket 100.

The front bracket 300 is formed with a contact portion 310 protruding forward in the protective structure 1. The contact portion 310 is formed permanently integrally with the front bracket 300, and is formed by casting using a strong member such as metal.

The contact portion 310 extends in the up and down direction at a left end portion of the protective structure 1 as viewed from the front side, and is bent in a right direction below the bolt BA3. In the contact portion 310, the rib LB directed in the up and down direction is formed on the right side of the bolt B33 and between the bolt BA2 and the bolt BA3.

<Action and Effect>

Figure 4A:
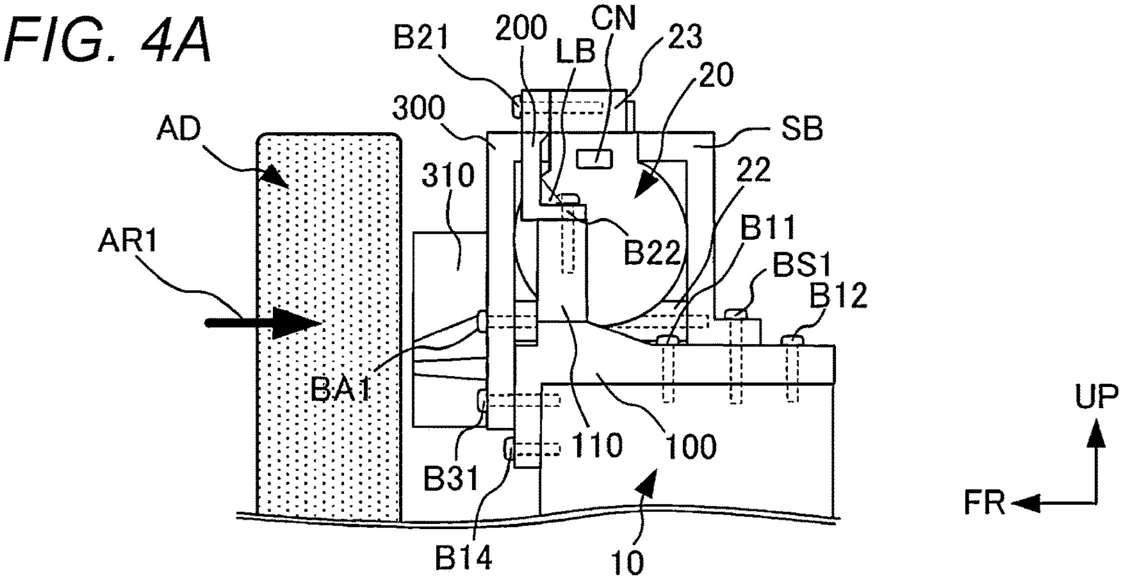
FIGS. 4A to 4C are side views illustrating operations when a collision occurs in the protective structure according to the embodiment of the disclosure in chronological order in FIGS. 4A to 4C.
Figure 4B:
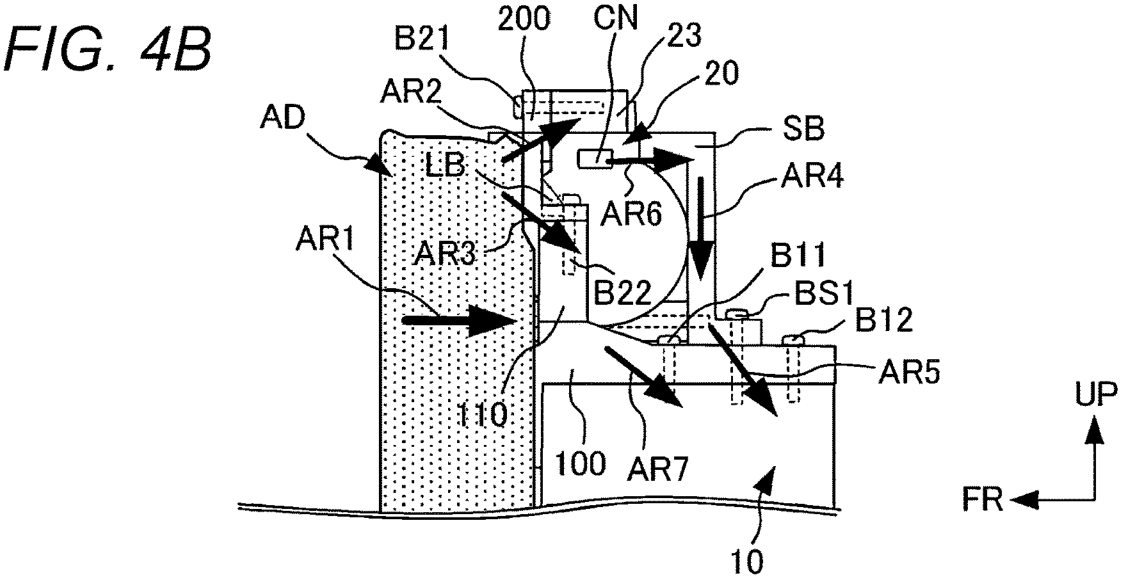

In the protective structure 1 according to the present embodiment configured as described above, an operation when a collision occurs in the vehicle V and, for example, the adjacent member AD collides in a direction indicated by an arrow AR1 in FIG. 4A will be described with reference to FIGS. 4A to 4C.

When a collision occurs in the vehicle V and the adjacent member AD collides in the direction indicated by the arrow AR1, collision energy is transmitted in the direction indicated by the arrow AR1.

The adjacent member AD collides with the front side of the protective structure 1 of the protective bracket 200. As illustrated in FIG. 4B, the collision energy is transmitted toward the rear side of the protective structure 1 while being dispersed in an arrow AR2 and an arrow AR3.

The collision energy directed in the direction of the arrow AR2 is transmitted from the fixing pedestal 23 to the fixing pedestal 21 via the bolt B21 in the protective bracket 200 to the sub bracket SB. The collision energy transmitted to the sub bracket SB is transmitted to the base 10 in a direction indicated by an arrow AR4 and is absorbed via the lower bracket 100 in a direction indicated by an arrow AR5.

At this time, the protrusion CN as the protection target part is provided on the air compressor 20 including the fixing pedestal 23. As indicated by an arrow AR6, energy that moves together with the air compressor 20 in the same direction as the collision energy transmitted to the fixing pedestal 23 is applied to the protrusion CN. The moving energy applied to the protrusion CN is directed in a direction away from the adjacent member AD.

The bolt B22 in the protective bracket 200 faces a direction different from that of the bolt B21. The collision energy received by the protective bracket 200 is directed in different directions via the fixing pedestal 23 and the fixing pedestal 110, and is dispersed in the sub bracket SB, the lower bracket 100, and the base 10.

The collision energy directed in the direction of the arrow AR3 is transmitted from the fixing pedestal 110 to the lower bracket 100 via the bolt B22 in the protective bracket 200. The collision energy is transmitted to the base 10 by the bolts B11 to B13 fixing the upper surface of the lower bracket 100 and the base 10 and the bolts BS1 and BS2 fixing the sub bracket SB, the lower bracket 100, and the base 10.

At this time, the bolts B22 in the protective bracket 200 are directed in the same direction as the bolts B11 to B13 for fixing the lower bracket 100 to the base 10 and the bolts BS1 and BS2 for fixing the sub bracket SB to the base 10. For example, the bolt B22 in the protective bracket 200, the bolts B11 to B13 in the lower bracket 100, and the bolts BS1 and BS2 in the sub bracket SB are fixed to the base 10 from the upper side to the lower side. The collision energy transmitted to the upper surface of the lower bracket 100 is transmitted to the base 10 via the bolts B11 to B13 and the bolts BS1 and BS2. Therefore, the collision energy is efficiently transmitted to the base 10 in the same direction indicated by an arrow AR7 as the direction indicated by the arrow AR3.

Figure 4C:
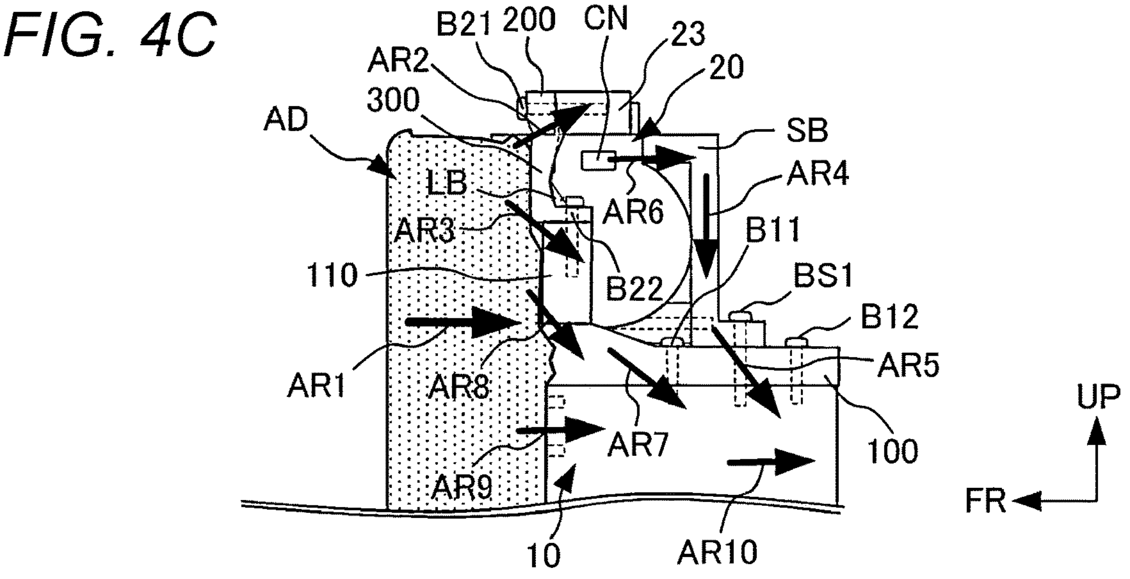

Further, when the collision energy is transmitted from the adjacent member AD, as illustrated in FIG. 4C, the collision energy is transmitted toward the rear side of the protective structure 1 while deforming the protective bracket 200.

A moment load is applied to the protective bracket 200 in the direction indicated by the arrow AR2 with an axis connecting fixing points of the bolt B21 on the fixing pedestal 23 and the bolt B22 on the fixing pedestal 110 as a rotation axis. Due to the applied moment load, the front side of the protective structure 1 of the protective bracket 200 is deformed so as to be turned upward about the axis connecting the fixing points of the bolt B21 and the bolt B22 as the rotation axis.

At this time, the protective bracket 200 is fixed to the fixing pedestal 23 of the air compressor 20 by the bolt B21. The protective bracket 200 is placed on the lower bracket 100 in a state of being divided from the lower bracket 100, and is fixed to the fixing pedestal 110 protruding upward by the bolt B22.

When viewed from the front side of the protective structure 1, the protective bracket 200 has an L shape directed to the right side from the fixing pedestal 23 and bent downward. Further, when viewed from the right side of the protective structure 1, the protective bracket 200 has an L shape that extends downward from the fixing pedestal 23, and is bent backward and directed toward the fixing pedestal 110.

Further, the distance D1 between the upper surface side of the lower bracket 100 and the upper surface side of the fixing pedestal 110 is longer than the distance D2 between the upper surface side of the fixing pedestal 110 and the center of the bolt hole of the fixing pedestal 23 as the second fixing portion.

In other words, the protective bracket 200 has a shape that brings the fixing pedestal 23 and the fixing pedestal 110 close to each other. Further, the fixing pedestal 110 protrudes to a distance at which the fixing pedestal 23 and the fixing pedestal 110 approach each other. Therefore, the protective structure 1 has a configuration in which the fixing pedestal 23 and the fixing pedestal 110 are brought close to each other, whereby the moment load applied to the protective bracket 200 is limited, and the deformation of the protective bracket 200 is limited.

Furthermore, on the rear side of the protective bracket 200, the rib LB having an inclination from the upper front side to the lower rear side in the protective structure 1 is provided.

Therefore, the shape of the protective bracket 200 limits deformation due to a moment load applied to the protective bracket 200, and the rib LB limits deformation of the protective bracket 200. When the adjacent member AD further collides with the fixing pedestal 110 of the lower bracket 100, the moment load applied to the protective bracket 200 is dispersed toward the lower bracket 100 and decreases.

Further, the adjacent member AD collides with the fixing pedestal 110 of the lower bracket 100. The collision energy is transmitted to the base 10 via the lower bracket 100 in a direction indicated by an arrow AR8.

When the adjacent member AD collides with the lower bracket 100 and the base 10, the collision energy is transmitted in a direction indicated by an arrow AR9. The collision energy applied from the adjacent member AD is further dispersed in the lower bracket 100 and the base 10.

The moment load applied to the protective bracket 200 is reduced by the collision energy applied from the adjacent member AD being further dispersed to the lower bracket 100 and the base 10, and deformation of the protective bracket 200 is limited.

The protrusion CN is disposed at a substantially intermediate point between the bolt B21 and the bolt B22 fixing the protective bracket 200. Therefore, with the distance from the protective bracket 200 ensured, the limited deformation of the protective bracket 200 does not interfere with the protrusion CN.

The collision energy applied from the adjacent member AD is transmitted to the base 10 while being dispersed in the directions indicated by the arrows AR2 to AR9. The collision energy transmitted to the base 10 is transmitted in a direction indicated by an arrow AR10 and absorbed by the frame FL.

Then, the movement of the adjacent member AD is stopped by the protective structure 1, and the transmission of the collision energy is terminated.

As described above, when a collision occurs on the vehicle V and, for example, the adjacent member AD collides against the protective structure 1, the protective bracket 200 receives collision energy, and the protective structure 1 transmits the collision energy to the base 10 while dispersing the collision energy among the fixing pedestal 23, the sub bracket SB, and the lower bracket 100 of the air compressor 20.

The protective structure 1 transmits and absorbs the collision energy to the base 10 and the frame FL while dispersing the collision energy, so that the adjacent member AD and the protective bracket 200 do not interfere with the protrusion CN as the protection target part provided in the air compressor 20 as a protection target member.

As described above, the protective structure 1 according to the present embodiment includes the lower bracket 100 as a first bracket including the fixing pedestal 110 as a first fixing portion protruding toward an upper side of the vehicle, and the protective bracket 200 as a second bracket that is placed on the fixing pedestal 110 of the lower bracket 100 in a state of being divided from the lower bracket 100 and covers the protrusion CN as a protection target part to be protected from interference of a collision object as a wall surface in an up and down direction, in which the protective bracket 200 is fixed to the fixing pedestal 23 as a second fixing portion provided on the air compressor 20 as a protection target member having the protrusion CN on an upper side of the protective bracket 200, and is further fixed to the fixing pedestal 110 of the lower bracket 100 on a lower side of the protective bracket 200, and the lower bracket 100 and the protective bracket 200 are disposed between the adjacent member AD as an adjacent member disposed adjacent to the protective bracket 200 and the protrusion CN.

That is, the lower bracket 100 and the protective bracket 200 are disposed between the adjacent member AD and the protrusion CN. Further, the protective bracket 200 is placed on the lower bracket 100 in a divided state and is fixed to the fixing pedestal 110. When a collision occurs in the vehicle V, the collision energy is transmitted to the protective bracket 200. The collision energy transmitted to the protective bracket 200 is transmitted from the fixing pedestal 23 fixed to the air compressor 20 to the lower bracket 100 and the base 10 via the sub bracket SB. Further, the collision energy transmitted to the protective bracket 200 is transmitted to the lower bracket 100 and the base 10 via the fixing pedestal 110 fixed to the lower bracket 100. Furthermore, the protective bracket 200 is fixed to the fixing pedestal 21 on the upper side of the vehicle, and is fixed to the fixing pedestal 110 on the lower side of the vehicle, so that the fixing points are close to each other. The moment load applied to the protective bracket 200 is limited, and deformation of the protective bracket 200 due to the moment load is limited.

Therefore, the protective structure 1 can efficiently disperse the collision energy received by the protective bracket 200 to the sub bracket SB, the lower bracket 100, and the base 10 via the fixing pedestal 23 and the fixing pedestal 110. Furthermore, since the protective bracket 200 has a shape that limits the moment load applied to the protective bracket 200, the protective structure 1 can limit deformation of the protective bracket 200. The protective structure 1 can effectively prevent the adjacent member AD and the protective bracket 200 from interfering with the protrusion CN by restricting deformation of the protective bracket 200.

Therefore, when a collision occurs in the vehicle, it is possible to effectively prevent interference with a device to be protected.

In the protective structure 1 according to the present embodiment, the distance D1 in the vehicle up and down direction between the vehicle upper side surface of the lower bracket 100 and the vehicle upper side surface of the fixing pedestal 110 is longer than the distance D2 in the vehicle up and down direction between the vehicle upper side surface of the fixing pedestal 110 and a center of a bolt hole of the fixing pedestal 23.

That is, the fixing pedestal 110 for fixing the protective bracket 200 protrudes from the vehicle upper side surface of the lower bracket 100 toward the vehicle upper side by a distance longer than the distance D2 in the vehicle up and down direction between the vehicle upper side surface of the fixing pedestal 110 and the bolt hole center of the fixing pedestal 23.

Therefore, since the protective structure 1 has a shape in which the fixing pedestal 23 and the fixing pedestal 110 of the protective bracket 200 are close to each other, the moment load applied to the protective bracket 200 is limited, and the protective structure 1 can further limit the deformation of the protective bracket 200 due to the moment load. The protective structure 1 can further effectively prevent the adjacent member AD and the protective bracket 200 from interfering with the protrusion CN by further restricting the deformation of the protective bracket 200.

Therefore, when a collision occurs in the vehicle, it is possible to effectively prevent interference with a device to be protected.

In the protective structure 1 according to the present embodiment, in the protective bracket 200, a fixing direction to the air compressor 20 provided with the protrusion CN as the protection target part and a fixing direction to the lower bracket 100 are different.

That is, the protective bracket 200 is fixed to the fixing pedestal 23 of the air compressor 20 in the front and rear direction of the protective bracket. Further, the protective bracket 200 is fixed to the fixing pedestal 110 of the lower bracket 100 in the up and down direction of the protective bracket.

When a collision occurs in the vehicle V, collision energy transmitted to the protective bracket 200 is directed from the fixing pedestal 23 toward the rear side in the protective structure 1, and is transmitted to the lower bracket 100 and the base 10 via the sub bracket SB. Further, the collision energy transmitted to the protective bracket 200 flows downward from the fixing pedestal 110 and is transmitted to the lower bracket 100 and the base 10.

Therefore, the collision energy received by the protective bracket 200 is directed in different directions via the fixing pedestal 23 and the fixing pedestal 110, and can be efficiently dispersed in the sub bracket SB, the lower bracket 100, and the base 10. The protective structure 1 can limit deformation of the protective bracket 200 by dispersing the collision energy, and can prevent the adjacent member AD and the protective bracket 200 from interfering with the protrusion CN.

Therefore, when a collision occurs in the vehicle, it is possible to effectively prevent interference with a device to be protected.

Note that, although the lower bracket 100 is fixed to the base 10 in the embodiment, the lower bracket 100 may be molded permanently integrally with the base 10.

Although the embodiment of the disclosure has been described in detail with reference to the drawings, the specific configuration is not limited to the embodiment, and includes a design and the like without departing from the gist of the disclosure.

The invention claimed is:

1. A protective structure comprising:

a first bracket comprising a first fixing portion protruding toward an upper side of a vehicle; and a second bracket that is placed on the first fixing portion of the first bracket in a state of being divided from the first bracket and covers a protection target part to be protected from interference of a collision object as a wall surface in a vehicle up and down direction, wherein the second bracket is fixed by a first bolt to a second fixing portion provided on a protection target member comprising the protection target part on an upper side of the second bracket, and is further fixed by a second bolt to the first fixing portion of the first bracket on a lower side of the second bracket, and the first bracket and the second bracket are disposed between the protection target part and an adjacent member disposed adjacent to the second bracket.

2. The protective structure according to claim 1, wherein in the second bracket, a fixing direction to the protection target member and a fixing direction to the first bracket are different.

3. The protective structure according to claim 1, wherein the first fixing portion protrudes from a vehicle upper side surface of the first bracket, and the protection target part protrudes from the protection target member.

4. The protective structure according to claim 1, wherein the second bracket has, when viewed from a front side of the vehicle, a substantially L shape that is bent from a lower side toward an upper side and is bent toward a left side on the upper side.

5. The protective structure according to claim 1, wherein the second bracket has, when viewed from a side of the vehicle, a substantially L shape that extends from an upper side to a lower side and is bent from a front side to a rear side on the lower side.

6. The protective structure according to claim 1, wherein the second bracket includes a rib provided on a rear side of the second bracket, the rib being inclined from an upper front side toward a lower rear side.

7. The protective structure according to claim 1, wherein the protection target part is disposed at a substantially intermediate point between a position at which the second bracket is fixed to the second fixing portion and a position at which the second bracket is fixed to the first fixing portion.

8. The protective structure according to claim 1, wherein the first bracket is fixed to a base.

9. The protective structure according to claim 1, wherein the first bracket is configured to cover a lower side of the protection target member.

10. The protective structure according to claim 1, wherein the second bracket is fixed to the second fixing portion in a vehicle front-and-rear direction, and the second bracket is fixed to the first fixing portion in a vehicle up and down direction.

11. The protective structure according to claim 1, wherein the protection target part comprises a connection connector configured to supply a high voltage to the protection target member.

12. The protective structure according to claim 1, wherein the protection target member comprises an air compressor.

13. A protective structure comprising:

a first bracket comprising a first fixing portion protruding toward an upper side of a vehicle; and a second bracket that is placed on the first fixing portion of the first bracket in a state of being divided from the first bracket and covers a protection target part to be protected from interference of a collision object as a wall surface in a vehicle up and down direction, wherein the second bracket is fixed to a second fixing portion provided on a protection target member comprising the protection target part on an upper side of the second bracket, and is further fixed to the first fixing portion of the first bracket on a lower side of the second bracket, wherein the first bracket and the second bracket are disposed between the protection target part and an adjacent member disposed adjacent to the second bracket, and wherein a distance in the vehicle up and down direction between a vehicle upper side surface of the first bracket and a vehicle upper side surface of the first fixing portion is longer than a distance in the vehicle up and down direction between a vehicle upper side surface of the first fixing portion and a center of a bolt hole of the second fixing portion.

14. The protective structure according to claim 13, wherein in the second bracket, a fixing direction to the protection target member and a fixing direction to the first bracket are different.

15. A protective structure comprising:

a first bracket comprising a first fixing portion protruding toward an upper side of a vehicle; and a second bracket that is placed on the first fixing portion of the first bracket in a state of being divided from the first bracket and covers a protection target part to be protected from interference of a collision object as a wall surface in a vehicle up and down direction, wherein the second bracket is fixed to a second fixing portion provided on a protection target member comprising the protection target part on an upper side of the second bracket, and is further fixed to the first fixing portion of the first bracket on a lower side of the second bracket, the first bracket and the second bracket are disposed between the protection target part and an adjacent member disposed adjacent to the second bracket, and wherein the second bracket is fixed to the first fixing portion from an upper side to a lower side in a vehicle up and down direction.

16. The protective structure according to claim 15, wherein the second bracket is fixed to the second fixing portion by a first bolt, and the second bracket is fixed to the first fixing portion by a second bolt.

* * * * *